(12) United States Patent
Dachauer et al.

(10) Patent No.: US 7,350,318 B2
(45) Date of Patent: Apr. 1, 2008

(54) CONTINUOUS THERMAL TREATMENT OF BULK MATERIAL

(75) Inventors: Christian Dachauer, Niederuzwil (CH); Camille Borer, Flurlingen (CH); Hans Geissbühler, Zuzwil (CH)

(73) Assignee: Buhler, AG, Uzwil (CH)

( * ) Notice: Subject to any disclaimer, the term of this patent is extended or adjusted under 35 U.S.C. 154(b) by 0 days.

(21) Appl. No.: 10/796,173

(22) Filed: Mar. 10, 2004

(65) Prior Publication Data
US 2004/0229182 A1 Nov. 18, 2004

Related U.S. Application Data

(63) Continuation of application No. PCT/CH02/00442, filed on Aug. 13, 2002.

(30) Foreign Application Priority Data

Sep. 11, 2001 (DE) ................ 101 44 747

(51) Int. Cl.
*F26B 17/00* (2006.01)
(52) U.S. Cl. .............. 34/576; 34/589; 34/590; 34/591; 432/15; 432/58
(58) Field of Classification Search ........... 34/576, 34/589, 590, 591; 432/58, 15, 128
See application file for complete search history.

(56) References Cited

U.S. PATENT DOCUMENTS

| | | | |
|---|---|---|---|
| 2,316,664 A | 4/1943 | Brassert et al. | |
| 3,360,867 A | 1/1968 | Sanderson | |
| 3,691,644 A | 9/1972 | Schnitzer | |
| 3,841,843 A | 10/1974 | Williams et al. | |
| 3,869,256 A | * 3/1975 | Ziegler | 422/139 |
| 4,161,578 A | 7/1979 | Herron | |
| 4,407,355 A | 10/1983 | Bonn et al. | |
| 4,664,889 A | 5/1987 | Steenge et al. | |
| 4,750,989 A | 6/1988 | Soderberg | |
| 4,958,443 A | 9/1990 | Haueter et al. | |
| 5,114,700 A | 5/1992 | Meihack et al. | |

(Continued)

FOREIGN PATENT DOCUMENTS

DE 195 00 383 A1 7/1996

(Continued)

*Primary Examiner*—Jiping Lu
(74) *Attorney, Agent, or Firm*—Buchanan Ingersoll & Rooney PC

(57) ABSTRACT

The invention relates to a device for continuous heat treatment of granulated materials, especially to the crystallization of polymer granulate, such as polyethyleneterephthalate (PET) for example. The device comprises several adjacent fluidization chambers respectively provided with a sieve plate through which a fluidization gas used to fluidize the granulate can be insufflated into the respective chamber from below via a gas inlet, the gas being able to escape via a gas outlet in the top area of the device. The first chamber takes up the greater part of the overall volume of all chambers and neighboring chambers are, respectively, fluidically connected by product throughflow openings in the separating walls arranged therebetween. The granulated material can be guided through several adjacent fluidization chambers, the absolute filling level of the fluidized granulating material in the first chamber being at least as high as the absolute filling level of the other adjacent chambers disposed downstream therefrom.

34 Claims, 6 Drawing Sheets

U.S. PATENT DOCUMENTS

| | | | |
|---|---|---|---|
| 5,133,137 A * | 7/1992 | Petersen | 34/576 |
| 5,264,196 A * | 11/1993 | Tanaka et al. | 423/258 |
| 5,269,262 A | 12/1993 | Salonen | |
| 5,516,880 A | 5/1996 | Walsh | |
| 5,590,479 A | 1/1997 | Ruf et al. | |

FOREIGN PATENT DOCUMENTS

| | | |
|---|---|---|
| EP | 0 379 684 A2 | 12/1989 |
| EP | 0 379 684 A3 | 12/1989 |
| EP | 0 481 799 A1 | 4/1992 |
| EP | 0 712 703 A2 | 5/1996 |
| EP | 0 712 703 A3 | 5/1996 |
| EP | 0 712 703 B1 | 5/1996 |
| GB | 1044007 | 9/1966 |
| GB | 1 449 372 | 9/1976 |
| GB | 2 189 164 A | 10/1987 |

* cited by examiner

CONTINUOUS THERMAL TREATMENT OF BULK MATERIAL

CROSS REFERENCE TO RELATED APPLICATIONS

This application claims priority under 35 U.S.C. §119 to German Application 101 44 747.7 filed in Germany on 11 Sep. 2001, and as a Continuation Application under 35 U.S.C. §120 to PCT/CH02/00442 filed as an International Application on 13 Aug. 2002 designating the U.S., the entire contents of which are hereby incorporated by reference in their entireties.

BACKGROUND

A device is disclosed for continuous thermal treatment of granular bulk material, in particular for the crystallization of polymer granulate, such as polyethylene terephthalate (PET), with a product inlet terminating in a chamber being the very first chamber upstream and a product outlet after the last chamber downstream. In addition, a method is disclosed for the continuous thermal treatment of granular bulk material, in particular for the crystallization of polymer granulate, such as polyethylene terephthalate (PET), using the device.

A device is known from EP 0 712 703 A2, for example, which comprises a housing with an inlet and an outlet for plastic chips which are to be subjected to heat treatment. The interior of the housing is divided into a first large chamber and several smaller chambers by a plurality of separating walls, wherein the separating wall between the first chamber and the adjacent chambers is higher than the separating walls between the smaller chambers. All chambers can be supplied with gas from below via a sieve bottom to fluidize the chip product. During operation, the fluidized product flows via the upper edge of the respective separating wall from one chamber to the next. In the process, because of the effervescent movement in the respective fluidization chambers, undesired backmixing may occur as chips jump and/or are injected back from one chamber into the adjacent upstream chamber. This leads to different residence times for different chips, which necessarily causes differences in the product quality of the chips.

DE 195 00 383 A1 discloses a device for continuous crystallization of polyester material in granulate form. Thermal treatment is carried out in a cylinder-shaped treating space which is also supplied with gas from below via a sieve bottom in order to fluidize the granulate with the treatment gas. Although by using only a single treating space for fluidization purposes, cost savings are realized and stirring tools and the like are no longer necessary, this still does not make it possible to ensure a very narrow range of residence times of the particles and, consequently, a largely uniform product quality of the granulate.

EP 0 379 684 A2 discloses a device and a method for continuous crystallization of polyester material in granulate form. This device comprises two separately disposed fluidization chambers (fluidized bed apparatuses), wherein the first chamber is an effervescent fluidized layer with a mixing characteristic and the second chamber is a flow bed with a plug flow characteristic. While this combination of different fluidization chambers yields a surprisingly homogeneous product quality, each of the two separate fluidized bed apparatuses requires its separate circuit with channels, fans, heat exchanges for the gas injection and fluidization gas as well as cyclonic separators and/or filters for removing dust that is generated as a result of abrasion of the granulate particles.

SUMMARY

An inexpensive and easy-to-operate device as well as a method are disclosed which ensure a very narrow range of residence times of the granulate particles that are fluidized and thermally treated in the device and, therefore, a homogeneous product quality.

Insofar as the device described above is concerned, several adjacent fluidization chambers are provided with a separate sieve bottom each through which a fluidization gas can be injected into the respective chamber in order to fluidize the granulate, characterized in that such gas can exit via a gas outlet disposed in the roof area of the device and the first chamber occupies a large part of the total volume of all chambers, and wherein adjacent chambers have a fluid connection by means of product passages in the respective separating walls that are disposed between them.

This simple, compact construction can require particularly little material and space. The adjacent chambers significantly reduce heat losses and/or the required heat insulation and, ultimately, permit an energy-saving operation. In addition, as the number of chambers increases, the range of residence times of the granulate in the device decreases. It is furthermore particularly advantageous that no preliminary transport is necessary between the chambers. In addition, it is sufficient to only use a single gas injection/fluidization stream, which is supplied throughout the entire sieve bottom. Overall, the device can be provided in an inexpensive manner, and the method as maintenance of the device are also found to be economical.

Preferably, product passages are provided between adjacent chambers on the bottom side between the sieve bottom and a lower end area of the separating wall between adjacent chambers. Alternatively or additionally, the product passages may also be provided between adjacent chambers on the wall side between a side wall and a lateral end area of the separating wall between the adjacent chambers. Surprisingly, once this arrangement of product passages is used, very little backmixing occurs between the chambers. In addition, this arrangement makes it easier to empty of the device after use, e.g. for cleaning or maintenance purposes, or in the case of product changes.

Advisably, further product passages are provided in the separating wall at roughly the height of the upper end of the fluidized layer.

In an exemplary embodiment, the product passages extend over the entire width and/or the entire height of the device from one side wall to the other side wall and/or from the sieve bottom to the upper end of the fluidized layer, wherein the product passages are provided as horizontal and/or vertical slits. In particular, each slit-shaped product passage extends along the entire width and/or along the entire height of a separating wall. Only horizontal slits can be used as product passages to achieve a narrow range of residence times.

In another exemplary embodiment, along the separating walls that are provided successively in the direction of transportation of the product, the product passages are disposed alternatingly on the bottom and at the height of the upper end of the fluidized layer. In this manner, all product particles are forced through the device along a roller coaster-like path, and for each chamber, the product inlet is located as far as possible from the product outlet, as a result of which all particles need to travel along a relatively long path through the respective chamber. In case the product passages are always in the bottom in adjacent separating walls, for example, particles might under certain conditions travel directly from one product passage through the next one without staying in the respective chamber for a long period of time. In view of the desired narrow range of residence times in the device, this would be counterproductive. Alternatively, along the separating walls that are provided successively in the direction of transportation of the product, the product passages can also be disposed alternatingly on the left wall-side end and on the right wall-side end of the separating wall. Again, as described above, the particles are forced to travel along a slalom-like path within the device. Both the roller coaster as well as the slalom configuration contribute to keeping the residence times of the product uniform and therefore contribute, in addition to the multi-chamber configuration of the device, to a narrow range of residence times.

It is also advisable to make the position of the product passages adjustable. This makes it possible to undertake product-specific optimizations, e.g. by adjusting the average residence times of the granulate particles in the device.

In this context, it is also particularly advantageous to make it possible to adjust the cross-section of the product passages. This permits optimizations by adjusting the cross-section of the product passages depending on the granular size of the granulate.

A minimum dimension, in particular the width of the slit of the cross-section of the product passages, can be set to between a minimum dimension of the granulate and approx. 20 cm. A particularly advantageous minimum dimension, in particular the width of the slit of the cross-section of the product passages, is in the range between twice the value of the minimum granulate size and approx. ten times the value of the minimum granulate size. This also contributes to decreasing the probability that a granulate particle will travel directly through a chamber from the chamber inlet to the chamber outlet. As a result, at least very short residence times are virtually impossible. This is particularly preferable and meaningful for the crystallization of polyesters such as PET since, in case the residence time of a polyester pellet is too short, insufficient crystallization occurs, which leads to sticky pellets. A residence time that is slightly too long, however, does not negatively impact product homogeneity in the case of crystallization of polyesters since the time-dependent rise in the level of crystallization initially increases sharply and then quickly reaches a saturation level. Another advantage is that the probability of backmixing is also minimized, which additionally increases the thermal efficiency of the device, and each chamber maintains a defined temperature.

In another exemplary embodiment, each of the product passages that is disposed on the bottom side or roughly at the height of the upper end of the fluidized layer in the separating wall and/or each of product passages that is disposed on the wall side are provided with a metal sheet which runs roughly parallel to the bottom and/or the respective side wall and which runs roughly perpendicular to the separating wall, wherein such metal sheet is secured on the edge of the respective product passage and extends, through the product passage, on both sides of such separating wall into the two adjacent chambers. In this manner, a product passage is created which has the form of a type of tunnel between this metal sheet and the bottom and/or the side wall. A particle which enters this tunnel in the direction opposite the flow of the fluidized product is therefore in all likelihood reflected back and forth between the tunnel walls and therefore has a longer time of residence in the product passage, which greatly increases the probability that, sooner or later, it will be dragged along as it is collides with other particles of the fluidized product stream. As a result, this tunnel version also makes backmixing, which leads to the above-mentioned negative consequences, more difficult and, ultimately, virtually impossible.

In the area of the bottom-side product passages and essentially opposite the metal sheet, injection areas can be disposed in the sieve bottom which make it possible to inject fluidization gas into the chamber at a speed which permits both a speed component perpendicular to the injection area as well as a speed component parallel to the injection area in the direction of flow of the fluidized granulate. For that purpose, a so-called conidur metal sheet can be used in which openings are not created by completely punching out and removing material from the sieve bottom, but rather by only partially punching out and then bending the partially punched-out material. Therefore, in the area of the product passage and, in particular, in the tunnel version, in the area of the tunnel, next to the fluidization component which extends perpendicularly upwards, a horizontal transportation component can be transferred onto the product, which also renders backmixing more difficult.

If necessary, it is also possible to connect at least the first chamber via its sieve bottom with an associated supply channel for fluidization gas, which is separate from a common supply channel for the remaining chambers. This can be achieved e.g. by a common air circuit which, upstream from the sieve bottom of the first chamber and the common sieve bottom of the remaining chambers, is provided with a branched section wherein, in each branch which is used as a supply line for the respective sieve bottom and as a draining line for the chambers, an adjustable flap is provided by means of which the gas supply and, therefore, also the gas speed can be adjusted for fluidization of the respective chambers. This makes it possible to supply gas and fluidize the first chamber under conditions that are different from those in the remaining chambers. For example, for the crystallization of polyesters, in the first chamber, a higher gas speed can be used for fluidization through the sieve bottom than in the other chambers. This is advantageous insofar as, in the product which has not yet or has hardly crystallized in the first chamber, which is far more stickier than the product in the adjacent remaining chambers, an increased gas speed can result in increased fluidization and therefore prevent the formation of agglomerates.

In most cases, however, it is sufficient to associate all chambers, via their respective sieve bottom, with a common supply channel for fluidization gas. This reduces the material cost of the device, and operation is simplified.

At the product outlet, an impact deagglomerator can be provided in which the product passage terminates. This impact deagglomerator breaks up any agglomerates which have formed in spite of all preventive measures.

The sieve bottoms of all chambers may be disposed in a single plane. Alternatively, the device may comprise chambers that are disposed along the fluidized granulate stream with staggered heights.

The layout of the first chamber can be defined by a cylindrical surrounding wall, and the remaining chambers are concentrically disposed with cylindrical walls radially on the outside of the first chamber. This construction can require particularly little space and material, and heat losses are also low. Alternatively, the layout of the first chamber can be defined by a pair of concentric, cylindrical walls, and the remaining chambers are concentrically disposed with their cylindrical walls radially inside of the inner cylindrical wall of the first chamber.

Instead of a cylindrical layout, the first chamber may also have a rectangular layout, and the remaining chambers may be disposed towards the outside of the first chamber. In addition to the aforementioned advantages of a cylindrical geometry, the rectangular shape is additionally advantageous insofar as it is particularly easy to construct. Alternatively, once again, the layouts of the first chamber can also be rectangular, and the remaining chambers are concentrically disposed inside the first chamber, e.g. nested inside each other, and may also have rectangular layouts.

All embodiments described above are particularly advantageous in case at least the remaining chambers are designed in such a manner that, in such chambers, the ratio between the layer height of the fluidized granulate and the smallest layout chamber size is in the range of 0.5 to 2. This target value for the above ratio ensures that, inside the fluidized product, no excessive formation of bubbles can occur. In case the layer height of the fluidized product is much greater than twice the smallest layout chamber size, many small bubbles may, while rising, combine to create a few or only a single big bubble which, due to the gravitational pressure, which decreases towards the top, may rise in the fluidized product and, once it reaches the surface of the fluidized layer, may cause collisions and/or cause the granulate particles to be thrown about. On the other hand, in case the bottom is only covered with a thin layer of the product, economical fluidization is not possible.

The first chamber which is located the farthest upstream can occupy a major part of the total volume of all chambers, i.e. in particular roughly half of the total volume of all chambers. It is advisable that the sieve bottom surface of the first chamber also accounts for a major part of the total sieve bottom surface of all chambers, i.e. again roughly half of the total sieve bottom surface of all chambers. This is particularly advantageous for the crystallization of polyesters. As a result, in the first chamber, in a first crystallization step, almost all particles can be largely crystallized. Considering that, during this first phase, isolated particles are still sticky, it is particularly important to achieve, in the first chamber, large-volume fluidization with a lower particle density than in the adjacent remaining chambers. In this case, the probability of collision of two sticky particles and, consequently, the formation of agglomerates is much smaller.

It is advisable to provide, on the downstream end of the last chamber, the product outlet in a wall in the form of a window and provide a slider by means of which the lower edge of the window can be adjusted. Alternatively, on the downstream end of the last chamber, the product outlet can be provided in the form of a type of pivotable gate whose height can be adjusted by pivoting the gate.

To prevent isolated granulate particles from exiting the device together with the fluidization gas which is drawn off in the roof area of the device, e.g. when larger bubbles reach the fluidized layer surface, above the fluidized layer, upstream from the vent, a so-called zigzag separator is disposed which allows the gas to pass while retaining the granulate particles and returning them to the fluidized bed.

The granulate can be conducted through the plurality of fluidization chambers that are disposed in series, wherein each such fluidization chamber has a sieve bottom through which, into the respective chamber, a fluidization gas (e.g. pure nitrogen or air) is injected for the purpose of fluidizing the granulate and, in the roof area of the device, such gas is drawn off, and the absolute filling height of the fluidized granulate in the first chamber is at least as high as the absolute filling height of the remaining chambers that are disposed downstream therefrom.

It is advisable to inject, into all chambers, fluidization gas with a uniform first treatment temperature, wherein the fluidization gas is preferably also used as a thermal source for heating the fluidized granulate. In the case of crystallization of PET, this uniform first treatment temperature is approx. 180° C. The still predominantly amorphous initial product enters the first chamber in the form of pellets at a temperature of approx. 20° C. and, at this low temperature, in a non-sticky form. In the first chamber, heat is not yet completely transferred onto the PET granulate, which, in turn, is advantageous since, in the amorphous or only slightly crystallized state, the propensity to stickiness when exposed to heat is still very high. In the adjacent chambers, the temperature of the PET granulate increases step by step, since in these chambers, the respective initial temperatures are always higher than in the preceding chambers and in each chamber, gas is injected at the same treatment temperature. As a result, an optimal crystallization process can be designed for PET wherein, from one chamber to the next, the temperature of the PET granulate develops towards the optimal crystallization temperature while, at the same time, the degree of crystallization of the PET increases from one chamber to the next and, as a result, the adhesive propensity is kept low even as the temperature increases.

If necessary, the fluidization gas may contain, at least partially, a gas which reacts with the fluidized granulate. For example, in the case of drying of food, this may be a disinfectant or aromatizing gas.

It is advisable to inject, into at least one of the remaining chambers, a fluidization gas with a second treatment temperature which can be used as a cold source to cool the fluidized granulate.

In all chambers, the fluidization gas is injected with the same overpressure and the same gas speed. If necessary, however, into the first chamber, the fluidization gas can be injected with a higher pressure and/or higher gas speed than in the remaining chambers. A higher gas speed leads to increased fluidization, i.e. expansion of the fluidized layer, whereas a higher gas pressure makes it possible to supply more heat via the fluidization gas.

BRIEF DESCRIPTION OF THE DRAWINGS

Further advantages, characteristics, and applications are described in the following description of a preferred embodiment herein, which refers to the attached drawing, wherein

In FIG. 5*c*, curve 1 relates to the fluidized layer shown in FIG. 5*a*, curve 2 relates to the fluidized layer shown in FIG. 5*b*, "A" is the sieve bottom area, "$A_{tot}$" is the total sieve bottom area for all of the chambers, and "$A/A_{tot}$" is the ratio of the sieve bottom area to the total sieve bottom area for all of the chambers.

DETAILED DESCRIPTION

Figure 1:
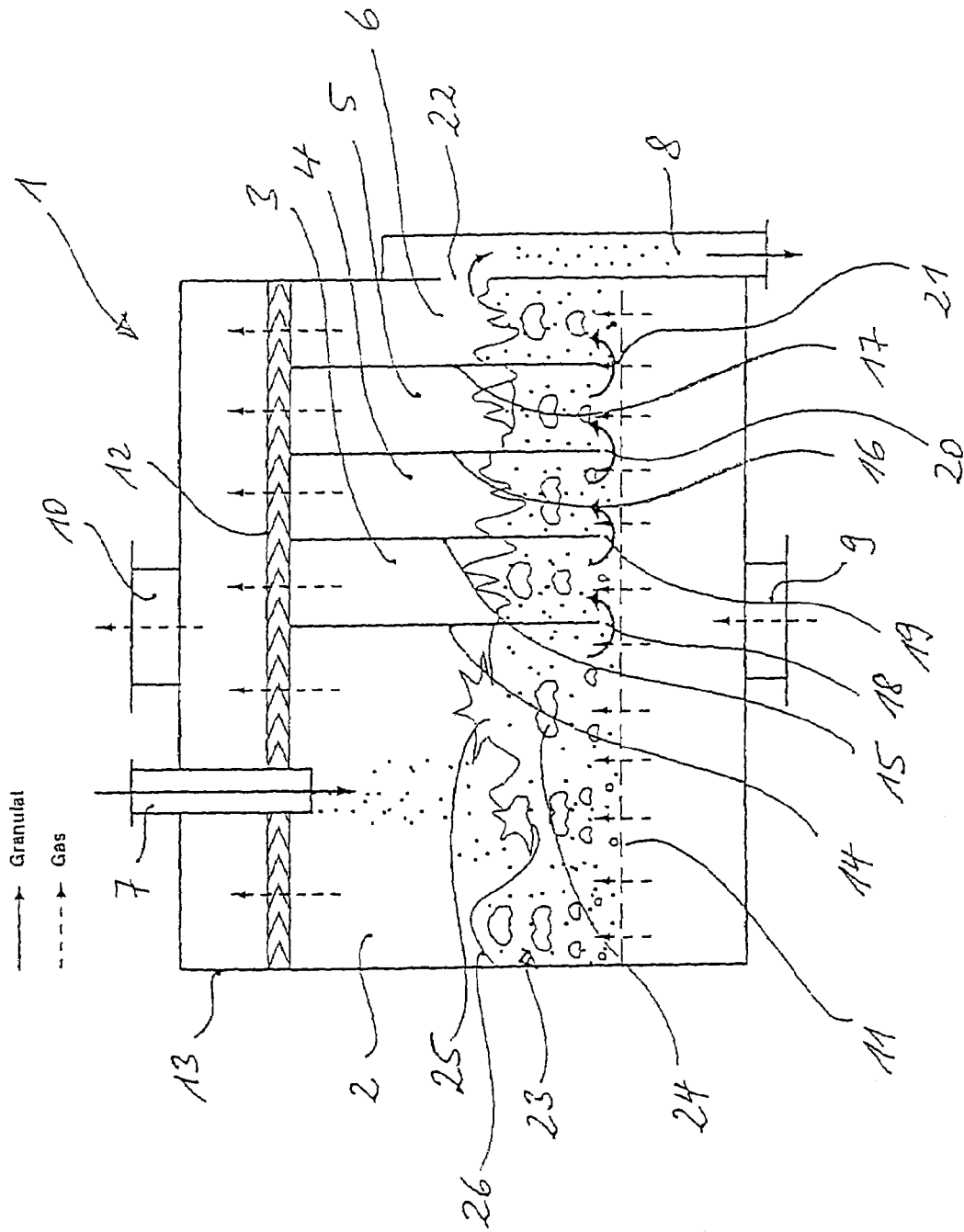
FIG. 1 is a cross-sectional view along a vertical plane of a first sample embodiment.

FIG. 1 is a schematic representation of a vertical cross-section of a first sample embodiment of the device 1. The device 1 forms a multiple-box crystallizer with a housing 13, in the interior of which several chambers 2, 3, 4, 5, and 6 are divided by the separating walls 14, 15, 16, and/or 17. The bottom of the chambers is provided by a sieve bottom 11 through which a fluidization gas can be supplied from below. Towards the top, the chambers are delimited by a zigzag separator 12 which forms the roof of the chamber. The front and rear walls of the chambers 2, 3, 4, 5, and 6 extend parallel above and/or below the drawing plane and are therefore not shown in the cross-sectional view.

The product to be fluidized and subjected to heat treatment, which is, in particular, polyethylene terephthalate (PET), is introduced into the device 1 via a product inlet 7 from the top and exits the device 1 via a product outlet 8. The fluidization gas is injected via a gas inlet 9 below the sieve bottom 11 into the device 1 and is drawn off, after passing the zigzag separator 12, via a gas outlet 10 in the roof area of the device 1. The granulate which enters the device 1 first reaches the first chamber 2, which accounts for a major part of the entire chamber volume, and is fluidized by the fluidization gas entering via the sieve bottom 11, creating a fluidized layer 23 comprising the granulate and the fluidization gas. The fluidized layer performs like a fluid, i.e. within the fluidized layer, a gravitational pressure forms, and the fluidized layer flows via the product passages 18, 19, 20, and 21 between a lower end area of the separating walls 14, 15, 16, and/or 17 and the sieve bottom 11 from the first chamber 2 into the adjacent chambers 3, 4, 5, and/or 6. At the end of the last chamber 6, in the end wall, a window 22 is provided at a certain height above the sieve bottom 11, and this height defines the height of all fluidized layers 23 in all chambers 2, 3, 4, 5, and 6. A schematic representation of the fluidized layer 23 is shown in FIG. 1.

Within the fluidized layer 23, bubbles may form which can rise to the top within the fluidized layer and combine to form larger bubbles 24 which burst as soon as they reach the surface of the fluidized layer 26 and throw the granulate around within the chamber. This is schematically shown in the area of the reference number 25.

Figure 2:
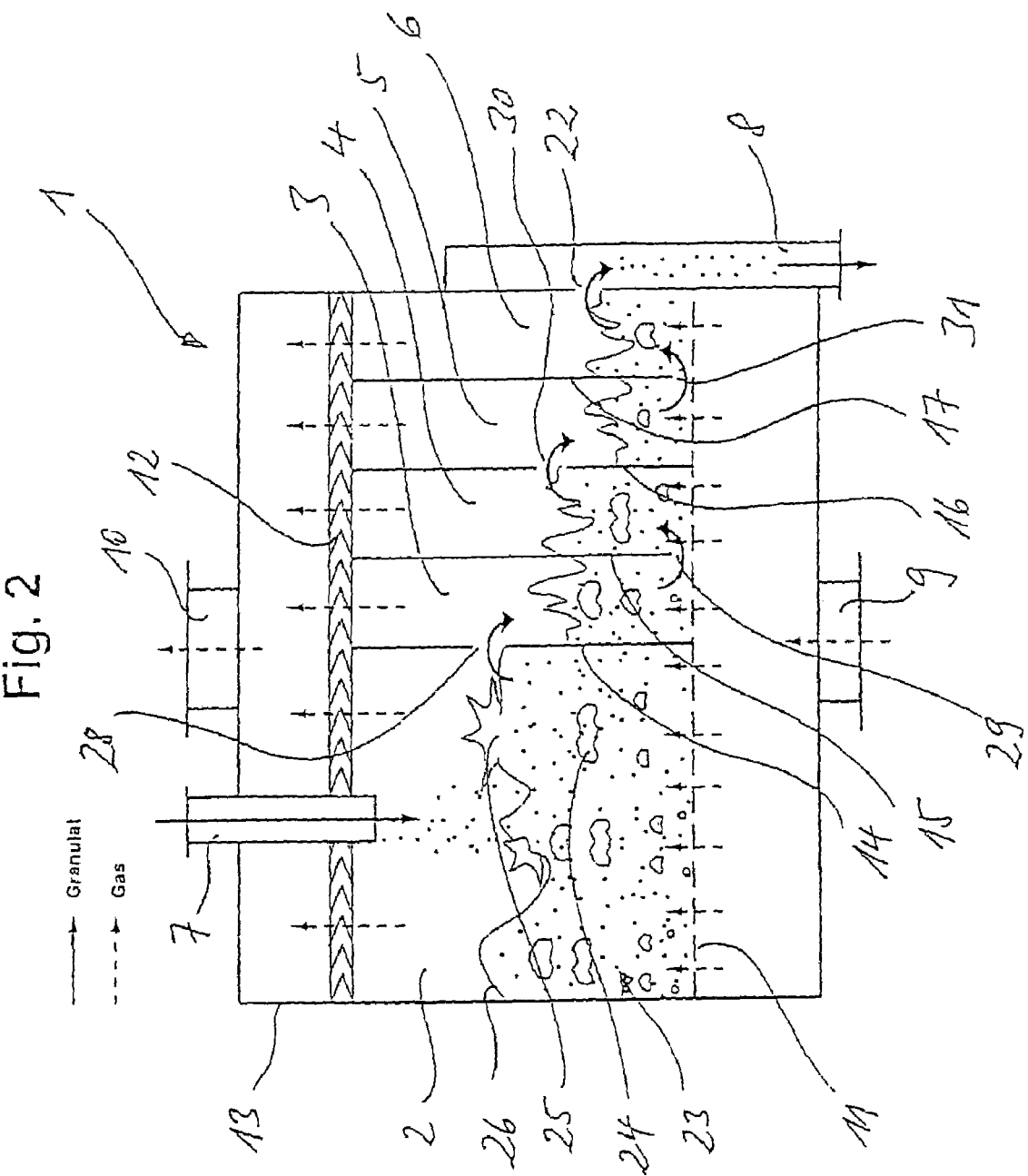
FIG. 2 is a cross-sectional view along a vertical plane of a second sample embodiment.

FIG. 2 is a vertical cross-sectional view of a second sample embodiment of the device 1. This second sample embodiment differs from the first sample embodiment insofar as in the separating walls 14, 15, 16, and 17 which are provided in series between the chambers 2, 3, 4, 5, and 6, the product passages 28, 29, 30, and/or 31 are alternately disposed at a certain height above the sieve bottoms 11 in the separating walls 14 and 15 and directly on the sieve bottom 11 in the separating walls 15 and 17. In this manner, the granulate particles, while traveling through the chambers 2, 3, 4, 5, and 6, are forced onto a path which alternatively runs on top and on the bottom, similar to a roller coaster. This is advantageous insofar as in each chamber, the upstream product passage and the downstream product passage are located as far way from each other as possible. As a result, all granulate particles are forced to travel along the longest possible path through each of the chambers 2, 3, 4, 5, and 6, as a result of which at least as few granulate particles as possible have a short residence time.

This is particularly advantageous for the crystallization of polyesters as they largely lose their stickiness after a minimum residence time in a crystallizer, whereas residence times that are too long do not adversely impact product quality. Due to the cascade-like arrangement of the product passages 28 and 30, the volume of the fluidized layers gradually decreases from the first chamber 2 to the second and third chamber 3, 4 and to the fourth and fifth chamber 5, 6. All reference numbers that are identical in FIG. 1 and FIG. 2 refer to the same or corresponding elements of the device 1.

Figure 3A:
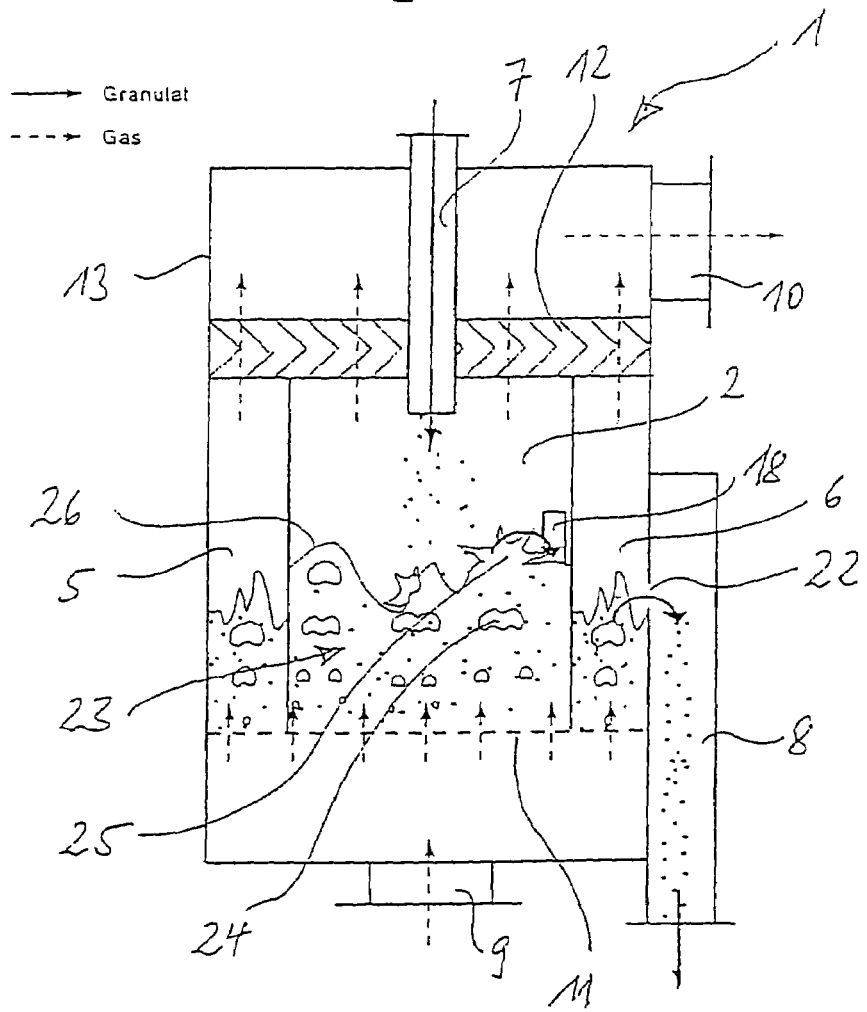
FIGS. 3*a* and 3*b* are cross-sectional views along a vertical and a horizontal plane of a third sample embodiment.
Figure 3B:
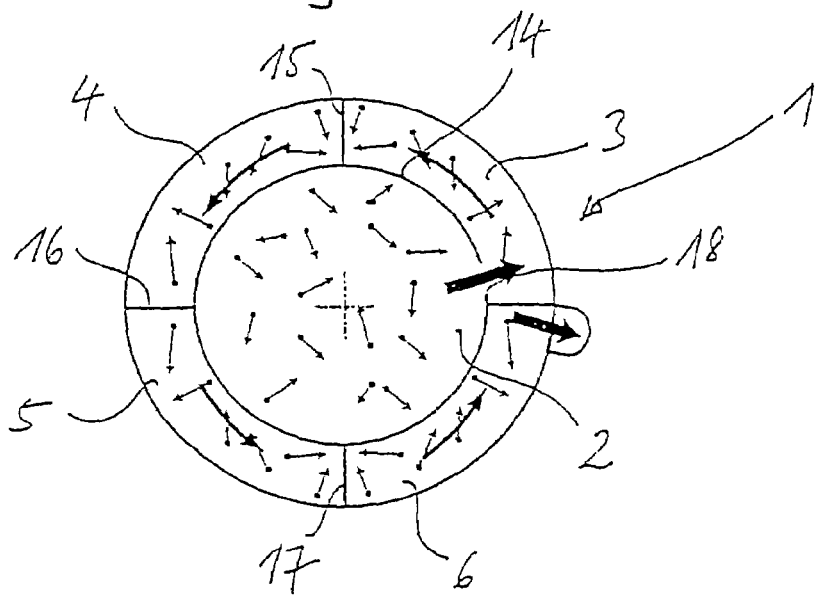

FIG. 3a is a vertical cross-sectional view of a third sample embodiment of the device 1, whereas FIG. 3b shows a horizontal cross-sectional view of such a third sample embodiment. As is clearly shown in FIG. 3b, the device 1 comprises a central cylindrical chamber 2 which, in turn, occupies a major part of the entire chamber volume of the device 1, as well as peripheral chambers 3, 4, 5, and 6, which are disposed radially from the central chamber 2 and surround the same along its entire circumference. The central chamber 2 is separated by means of a separating wall 14 from the chambers 3, 4, 5, and 6 which radially surround it, and the chambers 3, 4, 5, and 6, in turn, are delimited on the outside by the housing wall 13. Between the chambers 3, 4, 5, and 6, separating walls 15, 16, and 17 are provided, as a result of which four chambers 3, 4, 5, and 6 of equal size are created. At a certain height above the sieve bottom (FIG. 3a), a product passage 18 is provided to connect the first chamber 2 and the second chamber 3. While the product passages between the chambers 3, 4, 5, and 6 are not shown, they match the product passages 18, 19, 20, and 21 in FIG. 1 and/or the product passages 28, 29, 30, and 31 in FIG. 2.

Both in FIG. 1 and in FIG. 2 and in FIG. 3b, the height and/or the cross-sectional dimension of the window 22 can be adjustable. By making its height adjustable, the height of the fluidized layer 23 is adjusted, while making the cross-sectional dimension adjustable makes it possible to adjust the flow rate through the device 1. Both in the sample embodiments 1 and 2 with a rectangular geometry as well as in the sample embodiment 3 with a cylindrical geometry, the product passages can be provided on the bottom only (compare product passages 18, 19, 20, and 21 in FIG. 1), or they may alternately be provided on the top and bottom, creating a roller coaster configuration (compare product passages 28, 29, 30, and 21 in FIG. 2), or they may alternately be provided on the left or right end area of the series of separating walls 14, 15, 16, and 17 in the area of the side wall, providing a slalom-like configuration (not shown herein).

FIGS. 1, 2 as well as 3a and 3b describe three different sample embodiments of the device 1. In all three cases, they are different constructions of a five-stage fluidized layer 23. They differ in the configuration of the chambers 2, 3, 4, 5, and 6 and of the product passages 18, 19, 20, 21; 28, 29, 30, 31 as well as the product openings 22. Each five-stage fluidized layer comprises a large chamber 2, the (main) crystallization chamber, and four subsequent smaller chambers 3, 4, 5, 6 of equal size, where the product is homogenized. The chambers 3, 4, 5, 6 are either provided in series or disposed concentrically around the larger chamber 2. The fluidized layer apparatuses 1 are supplied by a single gas supply. As a result of the pressure drop, the gas its distributed over the sieve bottom 11 and the fluidized layer 23 throughout the individual chambers 2, 3, 4, 5, 6. The product passages 18, 19, 20, 21; 28, 29, 30, 31 are provided on the bottom, on the top, or alternately on the bottom/top. In the sample embodiment shown in FIG. 1, since the product passages 18, 19, 20, 21 are provided on the bottom, a fluidized layer 23 is created with a uniform height in the chambers 2, 3, 4, 5, 6. This height can be regulated via the height of the product outlet window 22 in the last chamber 6. As shown in FIG. 1, the absolute filling height of the fluidized granulate in the first chamber 2 is greater than in each of the chambers 3, 4, 5, 6 downstream of the first chamber. In the sample embodiment shown in FIG. 2, the layer height of the fluidized layer 23 can be independently adjusted in the chamber 2, the chambers 3 and 4, and in chambers 5 and 6 since the product passages 28, 29, 30, 31 are alternately disposed on the bottom and in the top, by adjusting the height position of the top product passages 28, 30.

Figure 4:
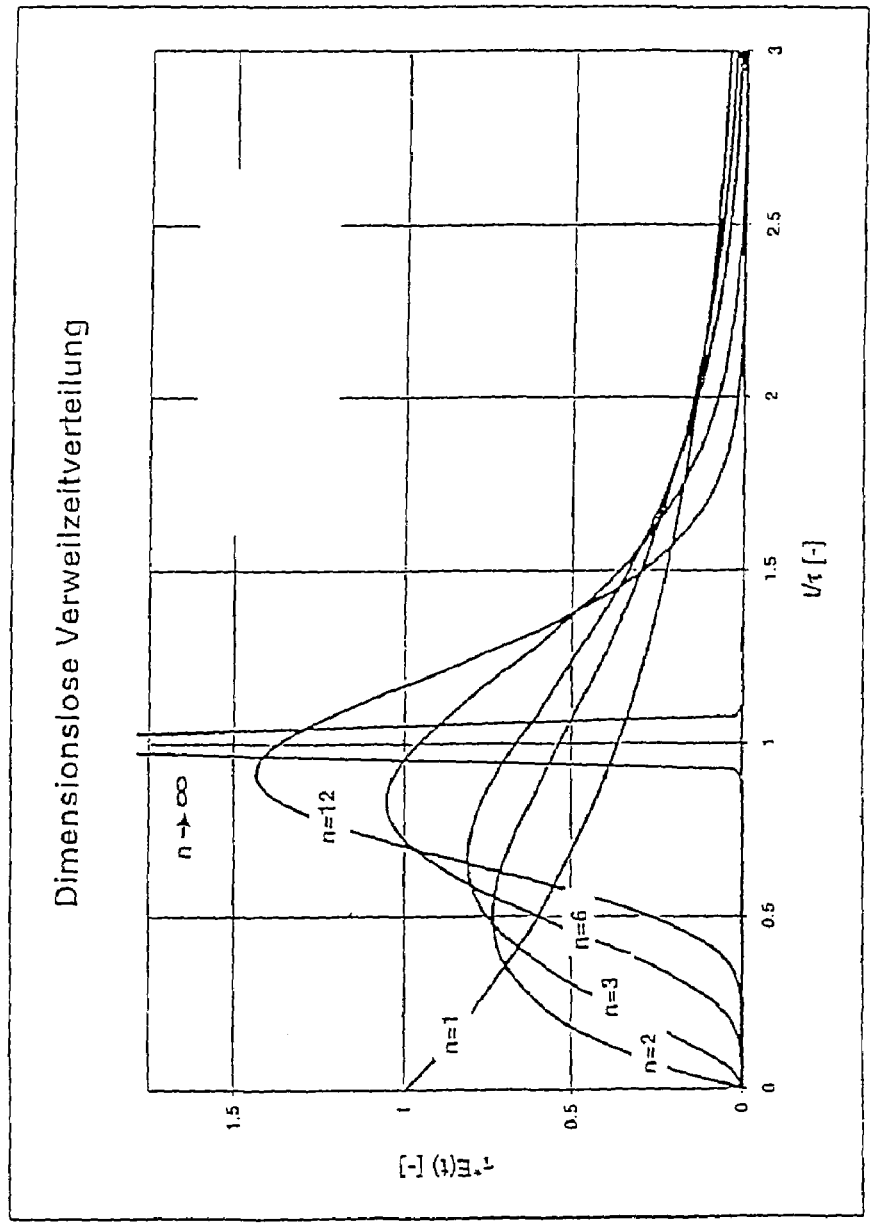
FIG. 4 is a diagram which shows how the range of residence times of granulate particles in the device depends on the number of chambers of the device.

FIG. 4 shows the dimensionless range of residence times of n ideally mixed, fluidized chambers and/or tank reactors (tank reactor cascade) that are connected in series. The calculation is based on the assumption that the average residence time of the product in the individual fluidized chambers and/or tank reactors is the same. Please note that as the number of fluidized chambers and/or tank reactors increases, the range of residence times decreases and, consequently, the homogeneity of the thermally treated product increases at the outlet of the apparatus. In case an endless number of fluidized chambers and/or tank reactors is used, a pure plug flow is obtained. In this case, all particles are exposed to the effects occurring in the individual chambers and/or reactors for the same period of time, and the quality of the product that is obtained is very homogeneous. In practice, it is often sufficient to divide the apparatus into a few chambers to obtain an improved and sufficiently high product quality.

Figure 5A:
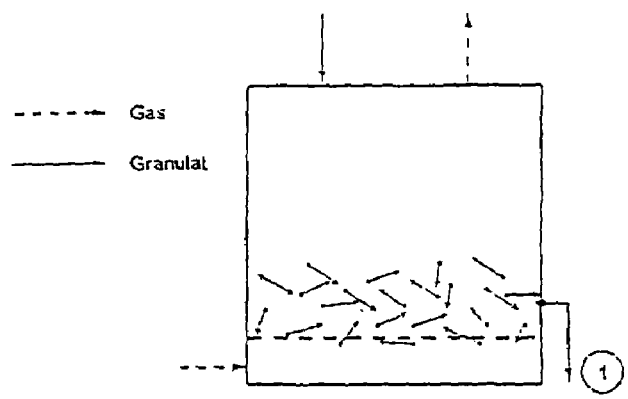
FIGS. 5*a* and 5*b* are schematic representations of a one-stage fluidized layer and a five-stage fluidized layer, respectively.
Figure 5B:
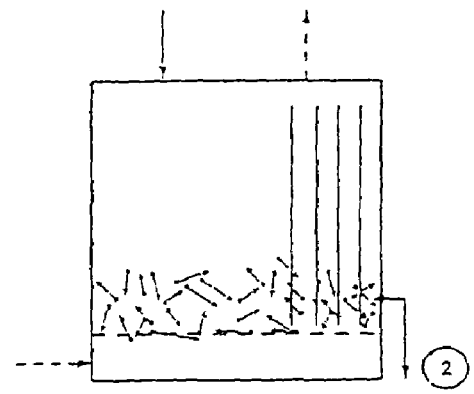
Figure 5C:
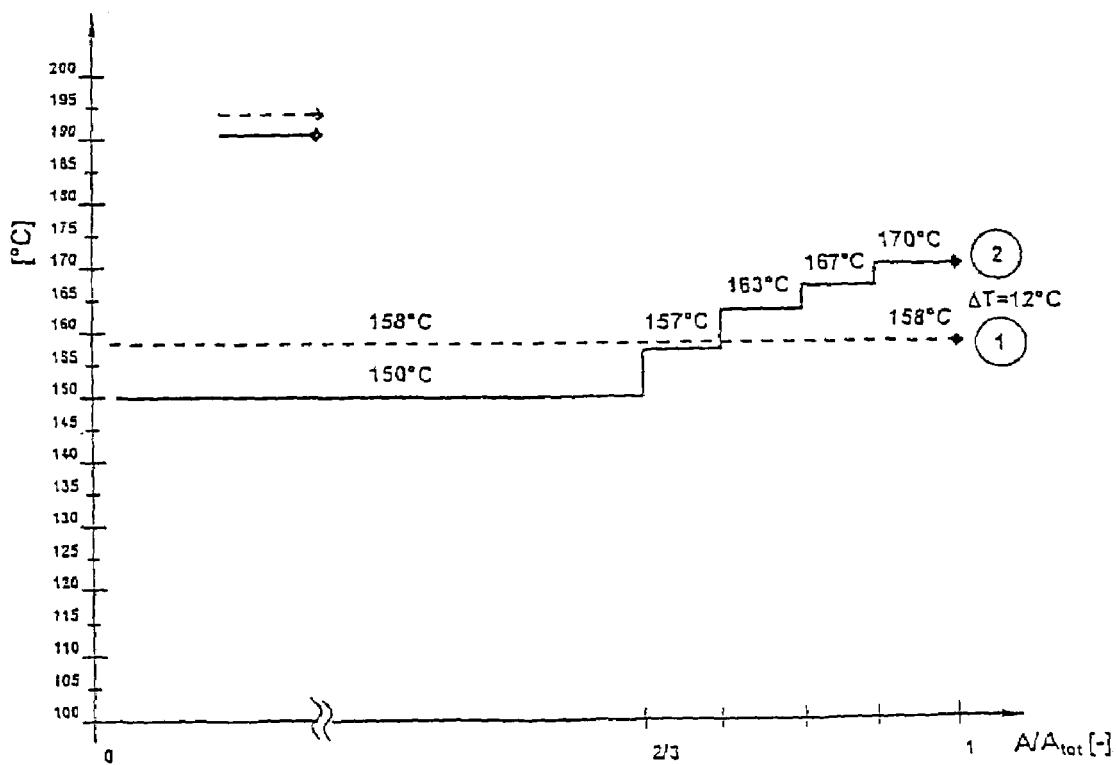
FIG. 5*c* shows the local temperature development of the product of the single-stage fluidized layer shown in FIG. 5*a* and the five-stage fluidized layer of FIG. 5*b*, respectively.

FIGS. 5a and 5b are schematic representations of a single-stage and a five-stage fluidized layer. FIG. 5c shows, as the result of a sample calculation, the local development of the product temperature both in this single-stage as well as this five-stage fluidized layer. As shown in FIG. 5c, the first chamber has an area, A, equal to ⅔ of the total area, $A_{tot}$, of all chambers, i.e., $A/A_{tot}=⅔$. In this example, the local product temperature development (temperature distribution) of the five-stage fluidized layer was compared with the local product temperature development (temperature distribution) of the single-stage fluidized layer. The product throughput and the operating parameters are representative for industrial facilities that are being constructed today. Please note that the crystallization heat that is released was included in the thermal balance of the first chamber (where a large part of the exothermal crystallization reaction occurs). It is apparent that, by dividing the fluidized layer into several stages/chambers, the heat exchange efficiency between the gas and the granulate can be significantly improved while, at the same time, the quality and homogeneity of the final product is also improved. In this example, it was possible to increase the thermal efficiency (defined and measured as the ratio between [product temperature at the product outlet-product temperature at the product inlet]/[treatment temperature at the gas inlet-product temperature at the product inlet]) by approx. 7.5%. As a result of a higher product temperature after crystallization, during a process step, which is usually carried out subsequently thereto, involving subsequent condensation of the solid phase (SSP), the size of the apparatus which is required therefor can be reduced.

Conclusion: the multi-stage fluidized layer can both provide an improved, e.g. narrower, range of residence times of the product in this multi-stage fluidized layer as well as an improved, i.e. increased, thermal efficiency of the thermal treatment of the product.

Figure 6A:
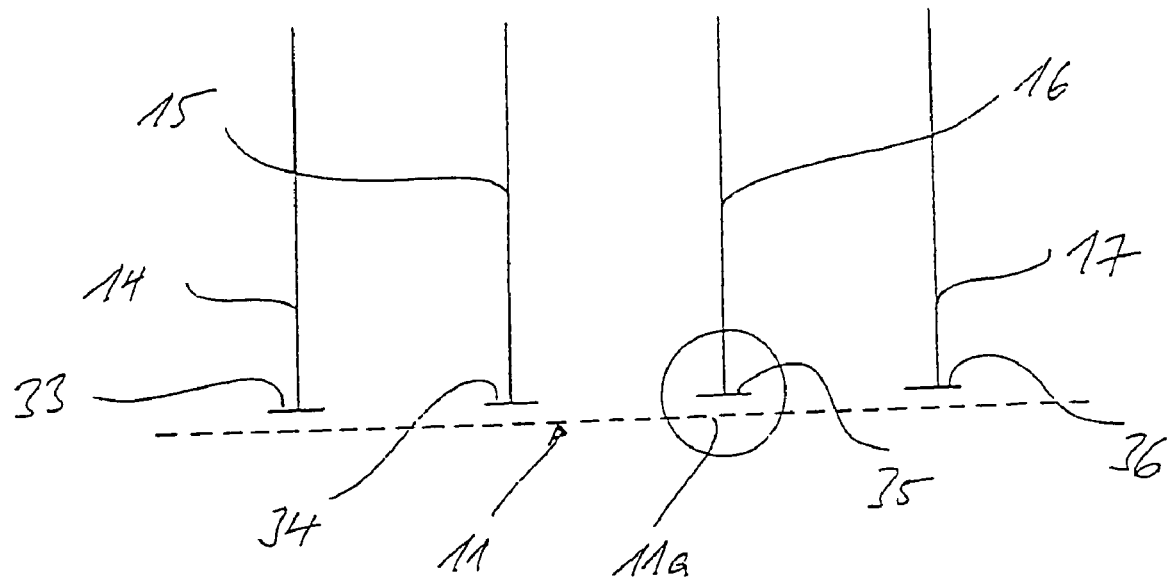
FIG. 6a is a first special design of the product passages between the chambers.
Figure 6B:
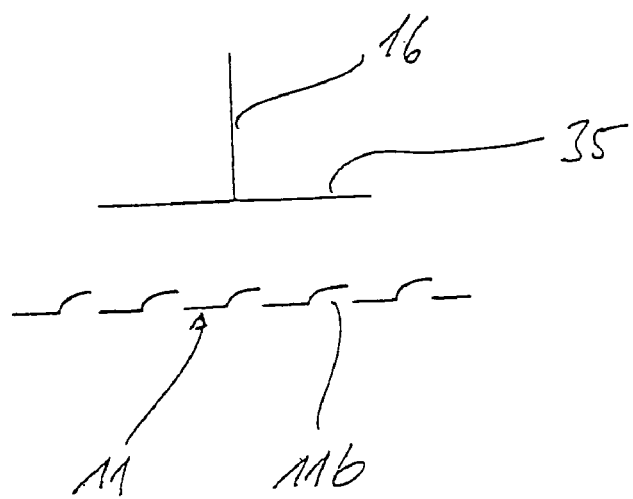
FIG. 6b is an enlargement of a second special design of the product passages between the chambers.

FIGS. 6a and 6b show a particularly advantageous first embodiment of the product passages between the chambers of the device.

FIG. 6a corresponds to a section of FIG. 1 showing the separating walls 14, 15, 16, and 17 in their lower section in the proximity of the sieve bottom 11. The sieve bottom 11 has holes 11a which were created by punching out and removing material. Other than in FIG. 1, however, the lower end of the separating walls 14, 15, 16, and 17 has been provided with a guide sheet 33, 34, 35, and/or 36 which extends, on both sides of the corresponding separating wall and perpendicularly thereto, into the chambers on both sides of the respective separating wall. The guide sheets 33, 34, 35, 36 make backmixing, e.g. a migration of the granulate particles backwards against the flow of granulate, more difficult. Backmixing reduces the thermal efficiency and widens the range of residence times on the side where longer residence times exist. The tunnel-shaped product passages 18, 19, 20, 21 that are formed thereby make it unlikely for a granulate particle to travel against the direction of flow of the fluidized granulate from one chamber back into a chamber located upstream therefrom since, in all likelihood, such a particle will be reflected back and forth between the sieve bottom 11 and the corresponding guide sheet 33, 34, 35, 36 and must remain in this tunnel for a while, as a result of which, ultimately, in all likelihood, it is dragged along through collisions with granulate particles drifting in the direction of flow of the granulate.

FIG. 6b shows a second embodiment of the product passages 18, 19, 20, 21 which has been improved compared with the first embodiment shown in FIG. 6a. The section of FIG. 6b matches the circled section of the first embodiment of the product passages in FIG. 6a, except that in this case, in the area of the tunnel opposite the corresponding guide sheet 33, 34, 35, 36, the sieve bottom 11 is provided with holes 11b created by only partially punching out material and bending such partially punched-out material. Through these holes 11b, the air that is drawn in receives, in addition to its vertical fluidization component perpendicular to the direction of flow of the granulate, a motion component parallel to and aligned with the direction of flow of the granulate. As a result, backmixing becomes even more improbable than in the embodiment of FIG. 6a.

Conclusion: the two embodiments of the product passages 18, 19, 20, 21 of FIGS. 6a and 6b can contribute to further improving the thermal efficiency and narrowing the range of residence times of the device 1.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A device for continuous thermal treatment of granular bulk material (granulate), comprising:
   a product inlet terminating in a chamber being the first chamber disposed upstream;

a product outlet following a last chamber being disposed downstream; and several adjacent fluidization chambers with a separate sieve bottom each through which, via a gas inlet, a fluidization gas can be injected into a respective chamber to fluidize the granulate, such gas can exit via a gas outlet disposed in a roof area of the device, and the first chamber occupies a large part of a total volume of all chambers, and wherein adjacent chambers have a fluid connection by means of product passages in separating walls that are disposed between them; and wherein each product passage that is disposed on the bottom side or roughly at a height of an upper end of a fluidized layer in the separating wall and/or each product passage that is disposed on a wall side includes a metal sheet which runs roughly parallel to the sieve bottom and/or respective side wall and which runs roughly perpendicular to the separating wall, wherein the metal sheet is secured on an edge of a respective product passage and extends, through the product passage, on both sides of such separating wall into the two adjacent chambers.

2. The device in accordance with claim 1, wherein the product passages are provided between adjacent chambers on a bottom side between the sieve bottom and a lower end area of the separating walls between the adjacent chambers.

3. The device in accordance with claim 2, wherein the product passages are provided as slits.

4. The device in accordance with claim 3, wherein each slit extends over an entire width and/or the entire height of a separating wall.

5. The device in accordance with claim 1, wherein the product passages extend over an entire width and/or an entire height of the device from one side wall to another side wall and/or from the sieve bottom to an upper end of a fluidized layer.

6. The device in accordance with claim 1, wherein along the separating walls that are provided successively in a direction of transportation of a product, the product passages are disposed alternatingly on a left wall-side end and on a right wall-side end of the separating wall.

7. The device in accordance with claim 1, wherein a width of a slit of a cross-section of the product passages is between a minimum dimension of the granulate and approximately 20 cm.

8. The device in accordance with claim 7, wherein the width of a slit of a cross-section of the product passages is in a range between twice a value of a minimum granulate size and approximately ten times the value of the minimum granulate size.

9. The device in accordance with claim 1, wherein, essentially opposite of the metal sheet, injection areas are disposed in the sieve bottom which make it possible to inject fluidization gas into the chamber at a speed which permits both a speed component perpendicular to the injection area as well as a speed component parallel to the injection area in a direction of flow of fluidized granulate.

10. The device in accordance with claim 1, wherein at least the first chamber is connected via its sieve bottom with an associated supply channel for fluidization gas, which is separate from a common supply channel for remaining chambers.

11. The device in accordance with claim 1, wherein all chambers are associated, via their respective sieve bottom, with a common supply channel for fluidization gas.

12. The device in accordance with claim 1, wherein at the product outlet, an impact deagglomerator is provided in which the product passage terminates.

13. The device in accordance with claim 1, wherein the sieve bottoms of all chambers are disposed in a single plane.

14. The device in accordance with claim 1, wherein a layout of the first chamber is defined by a cylindrical surrounding wall, and remaining chambers are concentrically disposed with their cylindrical walls radially on an outside of the first chamber.

15. The device in accordance with claim 1, wherein a layout of the first chamber is defined by a pair of concentric cylindrical walls, and remaining chambers are concentrically disposed with their cylindrical walls inside an internal cylindrical wall of the first chamber radially towards the inside.

16. The device in accordance with claim 1, wherein the first chamber has a rectangular layout, and remaining chambers are disposed towards an outside of the first chamber.

17. The device in accordance with claim 1, wherein a layout of the first chamber is rectangular, and remaining chambers are concentrically disposed inside the first chamber towards an inside, nested inside each other, and also have rectangular layouts.

18. The device in accordance with claim 1, wherein remaining chambers are designed in such a manner that, in such chambers, a ratio between a layer height of fluidized granulate and a smallest layout chamber size is in a range of 0.5 to 2.

19. The device in accordance with claim 1, wherein the volume of the first chamber accounts for roughly half of the total volume of all chambers.

20. The device in accordance with claim 1, wherein a sieve bottom surface of the first chamber accounts for a major part of a total sieve bottom surface of all chambers.

21. The device in accordance with claim 20, wherein a sieve bottom surface of the first chamber accounts for roughly half of the total sieve bottom surface of all chambers.

22. The device in accordance with claim 1, wherein on a downstream end of a last chamber, the product outlet is provided in a wall formed as a window and provided with a slider by which a lower edge of the window can be adjusted.

23. The device in accordance with claim 1, wherein on a downstream end of the last chamber, the product outlet can be provided formed as a type of pivotable gate whose height can be adjusted by pivoting the gate.

24. The device in accordance with claim 1, wherein the bulk material is polyethylene terephthalate (PET).

25. The device in accordance with claim 1, wherein the thermal treatment of granular bulk material is the crystallization of polymer granulate.

26. The device in accordance with claim 1, wherein the sieve bottom area of the first chamber is equal to ⅔ of the total sieve bottom area of all of the chambers.

27. A method for continuous thermal treatment of granular bulk material (granulate), comprising:
providing a device comprising:
a plurality of fluidization chambers;
a product inlet terminating in a first chamber located farthest upstream, the first chamber occupying a large part of a total volume of the chambers;
a product outlet following a last chamber disposed farthest downstream;
several adjacent fluidization chambers with a separate sieve bottom each through which, via a gas inlet, a fluidization gas can be injected into a respective chamber to fluidize the granulate, the fluidization gas can exit via a gas outlet disposed in a roof area of the device, wherein adjacent chambers have a fluid connection including product passages in separating walls that are disposed between the adjacent chambers; and a zigzag separator forming a roof of the chambers between a surface of the fluidized layer and a fluidization gas vent; and conducting the granulate through the fluidization chambers arranged in series, wherein each fluidization chamber has a sieve bottom through which, into the respective chamber, the fluidization gas is injected for fluidizing the granulate and, in a roof area of the device, the gas is drawn off, and an absolute filling height of fluidized granulate in the first chamber is at least as high as an absolute filling height of remaining chambers that are disposed downstream from the first chamber;

wherein the fluidization gas is injected into the first chamber at a higher pressure and/or at a higher gas speed than the fluidization gas is injected into the other chambers.

28. The method in accordance with claim 27, wherein into all chambers, the fluidization gas is injected at a uniform first treatment temperature.

29. The method in accordance with claim 28, wherein the fluidization gas is used as a thermal source for heating the fluidized granulate.

30. The method in accordance with claim 27, wherein the fluidization gas contains, at least partially, a gas which reacts with the fluidized granulate.

31. The method in accordance with claim 27, wherein into at least one remaining chamber, a fluidization gas is supplied at a second treatment temperature.

32. The method in accordance with claim 31, wherein the fluidization gas is used as a cold source to cool the fluidized granulate.

33. The method in accordance with claim 27, wherein in all chambers, the fluidization gas is supplied with an overpressure and at a same gas speed.

34. The method in accordance with claim 27, wherein the granulate is polymer granulate, and the polymer granulate is continuously crystallized while being conducted through the fluidization chambers.

* * * * *